(12) United States Patent
Chang et al.

(10) Patent No.: US 7,289,099 B2
(45) Date of Patent: Oct. 30, 2007

(54) TRANSFLECTIVE LIQUID CRYSTAL DISPLAY DEVICE AND METHOD OF FABRICATING THE SAME

(75) Inventors: Ming-Chin Chang, Yunlin (TW); Yang-En Wu, Taipei (TW); Po-Lun Chen, Chiayi (TW)

(73) Assignee: Au Optronics Corporation, Hsinchu (TW)

( * ) Notice: Subject to any disclaimer, the term of this patent is extended or adjusted under 35 U.S.C. 154(b) by 553 days.

(21) Appl. No.: 10/697,122

(22) Filed: Oct. 31, 2003

(65) Prior Publication Data

US 2004/0227719 A1    Nov. 18, 2004

(30) Foreign Application Priority Data

May 14, 2003    (TW) ............................... 92113026 A

(51) Int. Cl.
*G09G 3/36*  (2006.01)
(52) U.S. Cl. .................. 345/102; 345/87; 345/89; 345/211; 345/204; 349/213; 349/214; 438/257
(58) Field of Classification Search ................ 345/102, 345/207, 211, 87–89, 204
See application file for complete search history.

(56) References Cited

U.S. PATENT DOCUMENTS 5,157,525 A    10/1992    Eaton et al.
5,831,693 A * 11/1998    McCartney et al. .......... 349/42
6,144,359 A *  11/2000    Grave ........................ 345/102
6,597,488 B2 *  7/2003    Johnson et al. ............. 359/245
6,816,217 B2 * 11/2004    Sone .......................... 349/114

FOREIGN PATENT DOCUMENTS

JP       06-331962       12/1994

* cited by examiner

*Primary Examiner*—Richard Hjerpe
*Assistant Examiner*—Jennifer T Nguyen
(74) *Attorney, Agent, or Firm*—Rabin & Berdo, PC

(57) ABSTRACT

A transflective liquid crystal display device. A first substrate having viewing and peripheral areas is provided. The viewing area comprises transmissive and reflective regions. A backlight device is disposed under the first substrate, used to provide a backlight passing through the transmissive region. A power management controller connects the backlight device to control an intensity of the backlight. At least one photodetector is formed on the first substrate in the peripheral area, wherein the photodetector detects an intensity of ambient light above the first substrate, and then provides a corresponding signal to the power management controller to control the intensity of the backlight. According to the invention, the intensity of the backlight automatically becomes greater when the intensity of the ambient light becomes lower, and the intensity of the backlight automatically becomes lower when the intensity of the ambient light becomes greater.

7 Claims, 4 Drawing Sheets

TRANSFLECTIVE LIQUID CRYSTAL DISPLAY DEVICE AND METHOD OF FABRICATING THE SAME

BACKGROUND OF THE INVENTION

1. Field of the Invention

The present invention relates to a transflective liquid crystal display device, and more particularly, to self adjustment of display brightness according to ambient lighting in a transflective liquid crystal display device.

2. Desciption of the Related Art

Liquid crystal display (LCD) devices are widely used as displays in devices, such as a portable televisions and notebook computers. Liquid crystal display devices are classified into two types. One is a transmissive type liquid crystal display device using a backlight as a light source, and another is the reflective type liquid crystal display device using an external light source, such as sunlight or an indoor lamp. It is difficult to decrease the weight, the volume, and the power consumption of the transmissive type LCD due to the power required by the backlight component. The reflective type LCD has the advantage of not requiring a backlight component, but it cannot operate without an external light source.

In order to overcome the drawbacks of these two types of LCDs, a transflective LCD device which can operate as both a reflective and transmissive type LCD is disclosed. The transflective LCD device has a reflective electrode in a pixel region, wherein the reflective electrode has a transmissive portion. Thus, the transflective LCD device consumes less than a conventional transmissive type LCD device because a backlight component is not used when sufficient ambient light is present. Further, in comparison with the reflective type LCD device, the transflective LCD device has the advantage of operating as a transmissive type LCD device using a backlight when no external light is available.

FIG. 1 is an exploded perspective view illustrating a typical transflective LCD device. The transflective LCD device includes upper and lower substrates 10 and 20 opposite to each other, and a liquid crystal layer 50 interposed therebetween. The upper substrate 10 is called a color filter substrate and the lower substrate 20 is called an array substrate. In the upper substrate 10, on a surface opposing the lower substrate 20, a black matrix 12 and a color filter layer 14 including a plurality of red (R), green (G) and blue (B) color filters are formed. That is, the black matrix 12 surrounds each color filter, in the shape of an array matrix. Further on the upper substrate 10, a common electrode 16 is formed to cover the color filter layer 14 and the black matrix 12.

In the lower substrate 20, on a surface opposing the upper substrate 20, a TFT "T" as a switching device is formed in shape of an array matrix corresponding to the color filter layer 14. In addition, a plurality of crossing gate and data lines 26 and 28 are positioned such that each TFT is located near each cross point of the gate and data lines 26 and 28. Further on the lower substrate 20, a plurality of pixel regions (P) are defined by the gate and data lines 26 and 28. Each pixel region P has a pixel electrode 22 comprising a transparent portion 22a and an opaque portion 22b. The transparent portion 22a is made of a transparent conductive material, such as ITO (indium tin oxide) or IZO (indium zinc oxide), and the opaque portion 22b is made of a metal having high reflectivity, such as Al (aluminum).

FIG. 2 is a sectional view of a conventional transflective LCD device, which helps to illustrate the operation of such devices. As shown in FIG. 2, the conventional transflective LCD device includes a lower substrate 200, an upper substrate 260 and an interposed liquid crystal layer 230. The upper substrate 260 has a common electrode 240 and a color filter 250 formed thereon. The lower substrate 200 has an insulating layer 210 and a pixel electrode 220 formed thereon, wherein the pixel electrode 220 has an opaque portion 222 and a transparent portion 224. The opaque portion 222 of the pixel electrode 220 can be an aluminum layer, and the transparent portion 224 of the pixel electrode 220 can be an ITO (indium tin oxide) layer. The opaque portion 222 reflects ambient light 270, while the transparent portion 224 transmits light 280 from a backlight device 290 disposed at the exterior side of the lower substrate 200. The liquid crystal layer 230 is interposed between the lower and upper substrates 200 and 260. Thus, the transflective LCD device is operable in both reflective and transmissive modes.

In order to obtain a stable display quality of the transflective LCD, it is desirable for the display brightness to also change when the ambient light of the environment changes. For example, when the ambient light becomes darker, the backlight has to become brighter to maintain the determined total display brightness. Contrarily, when the ambient light becomes brighter, the backlight intensity is decreased to maintain the determined total display brightness and reduce power consumption. Nevertheless, current transflective LCDs require manual adjustment to change the intensity of the backlight. This method of adjustment and is very inconvenient for users.

In U.S. Pat. No. 5,157,525, Eaton et al disclose an LCD device employing a photodetector to compensate for variation in the characteristics of the liquid crystal. The LCD uses a photodetector to detect the transmissivity of liquid crystal elements under the ON and OFF states. According to the signal from the photodetector, the voltage level of the pixel driving element can be adjusted to obtain an optimum contrast and brightness. Though effective, this method, nevertheless, does not disclose how to obtain optimum display brightness when the ambient light of the environment changes.

SUMMARY OF THE INVENTION

The object of the present invention is to provide a smart transflective liquid crystal display device and its fabricating method.

Another object of the present invention is to provide a transflective liquid crystal display device, which can self-adjust a backlight intensity to maintain optimum (or stable) display brightness whether the ambient light of the environment changes.

In order to achieve these objects, the present invention provides a transflective liquid crystal display device. A display panel having a viewing area is provided, wherein the viewing area comprises a transmissive region and a reflective region. A backlight device is disposed under the display panel, wherein the backlight device provides a backlight passing through the transmissive region. A power management controller is connected to the backlight device, wherein the power management controller controls the intensity of the backlight. At least one photodetector is located on the display panel outside the viewing area, wherein the photodetector detects the intensity of ambient light around the display panel, and then provides a corresponding signal to the power management controller to control the intensity of the backlight. The intensity of the backlight automatically becomes greater when the intensity of the ambient light becomes lower, and the intensity of the backlight automatically becomes lower when the intensity of the ambient light becomes greater, based on a corresponding signal of the power management controller.

In order to achieve these objects, the present invention additionally provides a method of manufacturing a transflective liquid crystal display device. A first substrate having a viewing area and a peripheral area is provided. A metal layer is formed on part of the first substrate in both the viewing and the peripheral areas, wherein the metal layer in the viewing area serves as a gate. A gate insulating layer is formed on the gate. A semiconductor layer is formed on the gate and the metal layer in the peripheral area. A source electrode and a drain electrode are formed on part of the semiconductor layer on the gate insulating layer. An insulating layer is formed over the first substrate. A first opening and a second opening are formed to penetrate the insulating layer, wherein the first opening exposes the drain electrode and the second opening exposes the semiconductor layer in the peripheral area. A transparent conductive layer is formed in the second opening and the first opening, and the transparent conductive layer extends to part of the insulating layer. A reflective layer is formed on part of the insulating layer. A backlight device is disposed under the first substrate, providing light which passes through the opening in the transparent conductive layer to the exposed underlying insulating layer. A power management controller is connected to the backlight device, wherein the power management controller controls the intensity of the backlight. A photodetector consists of the metal layer, the semiconductor layer and the transparent conductive layer in the peripheral area. The photodetector detects an intensity of ambient light above the first substrate, and then provides a corresponding signal to the power management controller to control the intensity of the backlight. The intensity of the backlight automatically becomes greater when the intensity of the ambient light becomes lower, and the intensity of the backlight automatically becomes lower when the intensity of the ambient light becomes greater, based on a corresponding signal of the power management controller.

The present invention improves on the prior art in that the transflective LCD device has at least one photodetector located on the LCD panel. The photodetector senses ambient lighting conditions above the first substrate, and then provides a corresponding signal to the power management controller to control the intensity of the backlight. Thus, the total amount of reflected and transmitted light can be optimally maintained. In addition, the photodetector can be simultaneously fabricated with the TFT. The transflective LCD device of the present invention can self-adjust the backlight intensity to provide optimum (or stable) display based on the availability and intensity ambient light, simplifying use thereof and ameliorating the disadvantages of the prior art.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

Figure 1:
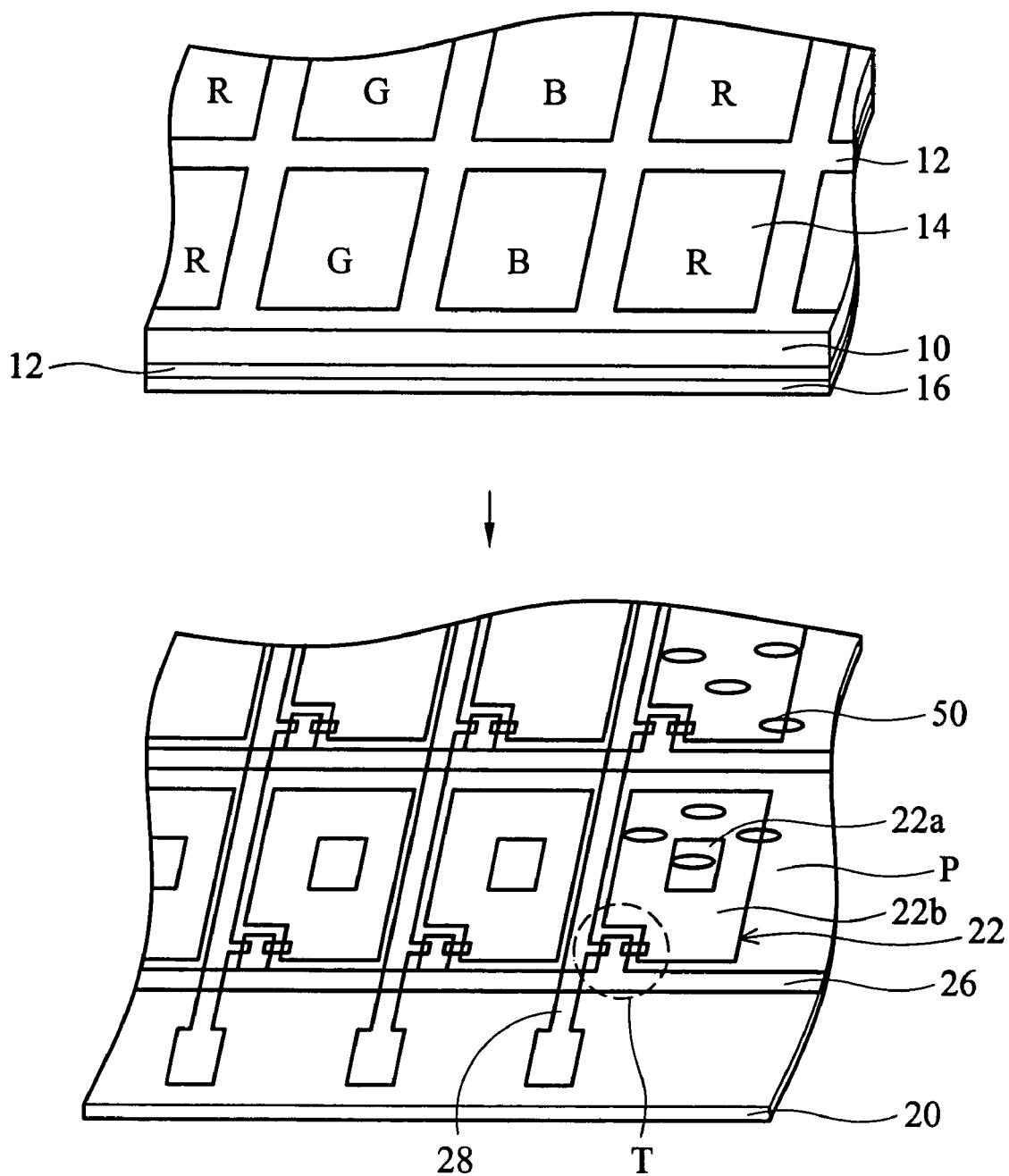
FIG. 1 is an exploded perspective view illustrating a typical transflective LCD device.
Figure 2:
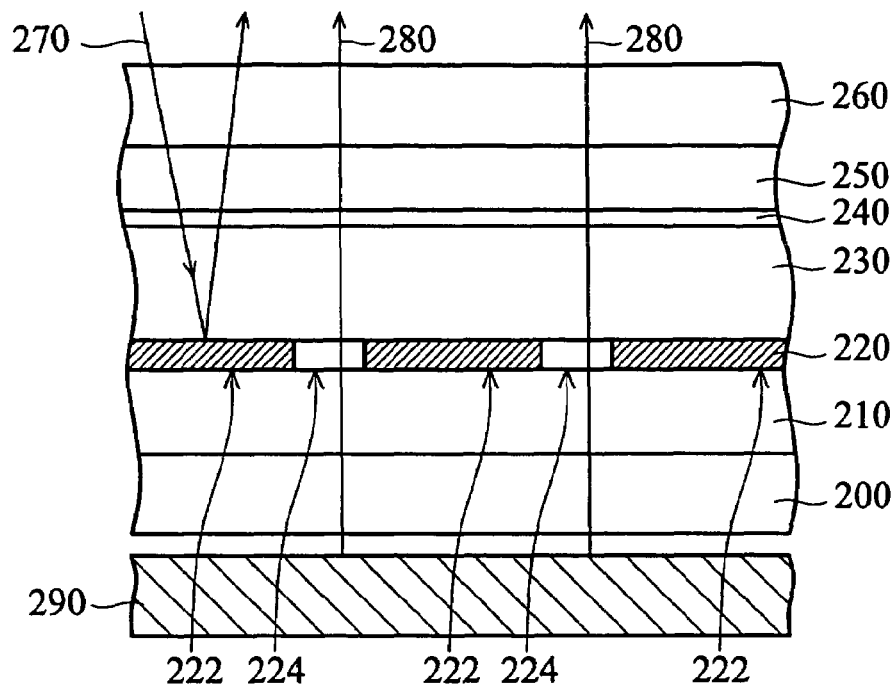
FIG. 2 is a sectional view of a transflective LCD device according to the prior art, illustrating the operation thereof.

Reference will now be made in detail to the present preferred embodiments of the invention, examples of which are illustrated in the accompanying drawings. Wherever possible, the same reference numbers are used in the drawings and the description to refer to the same or like parts.

Figure 3:
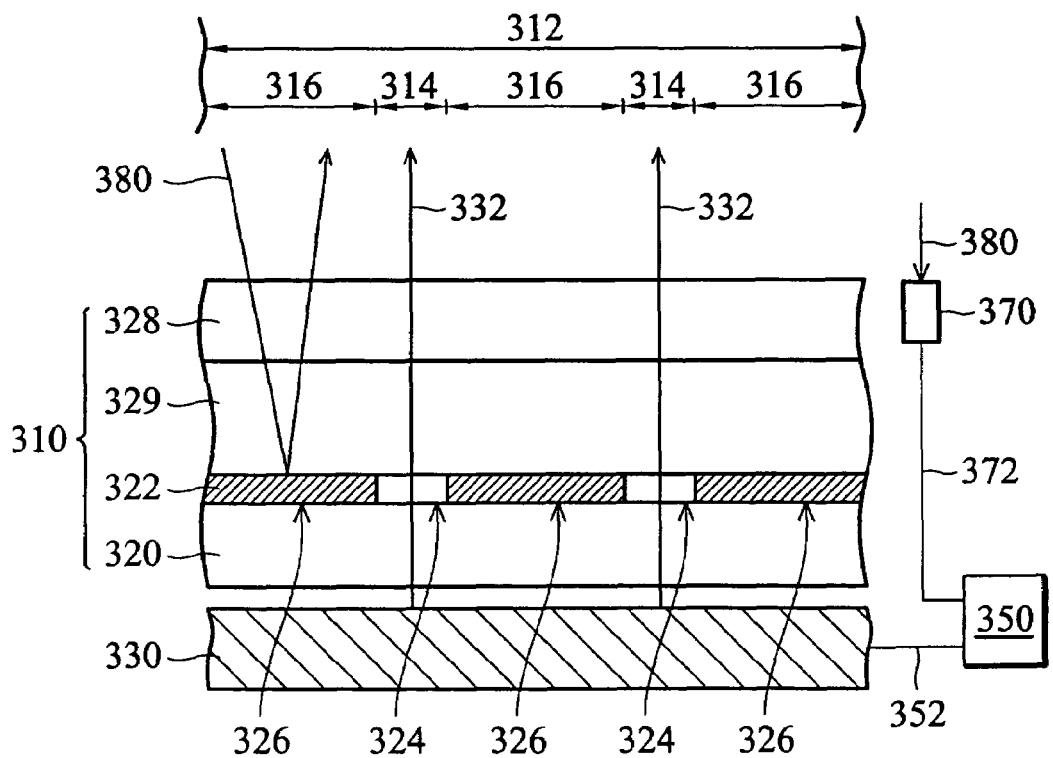
FIG. 3 is a sectional view according to the present invention.
Figure 4:
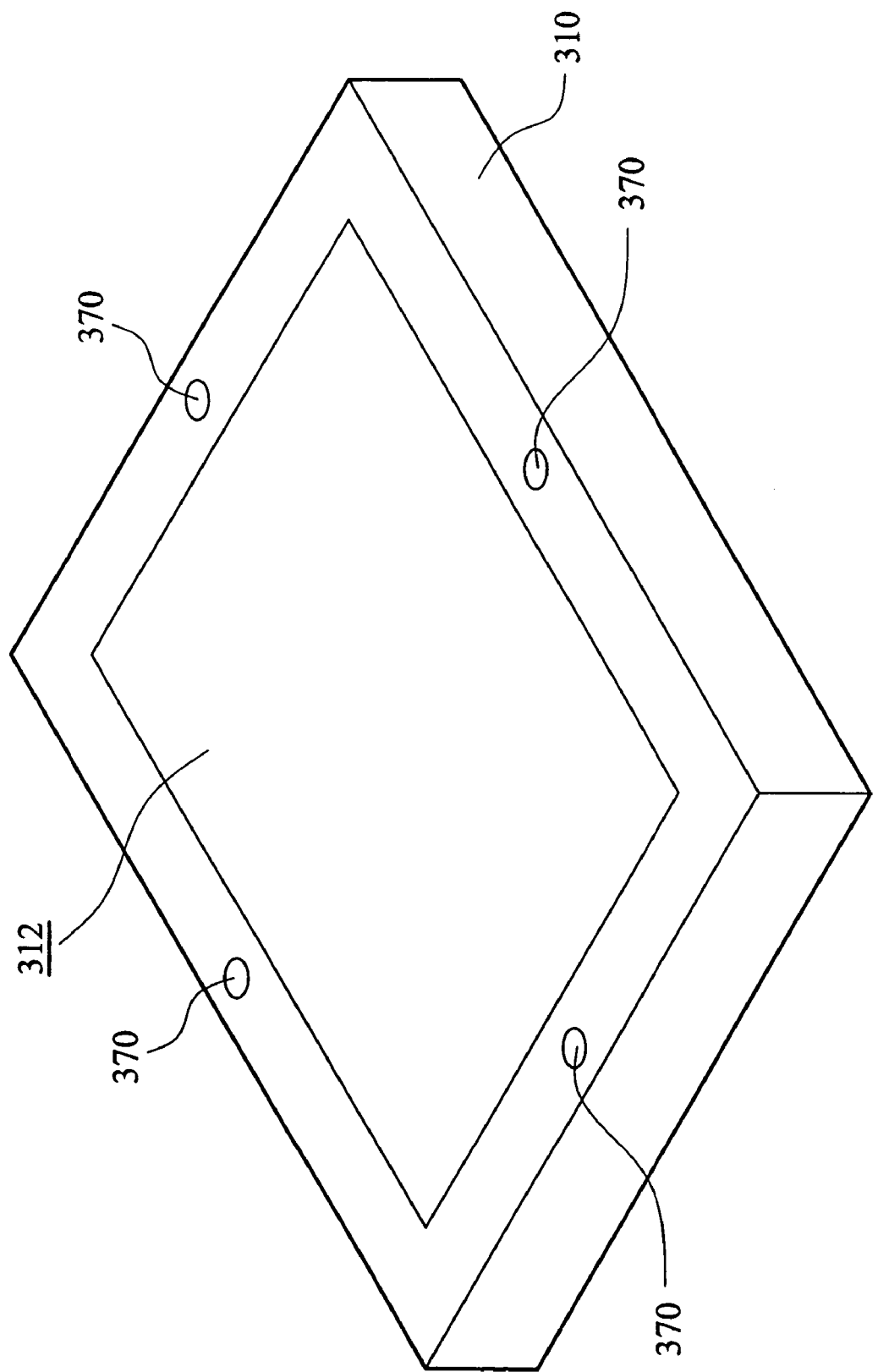
FIG. 4 is a topographical view of the display panel showing the placement of the photodetectors of the preferred embodiment of the present invention.

FIG. 3 is a sectional view according to the present invention. FIG. 4 is a topographical view of the display panel showing the placement of the photodetectors of the preferred embodiment of the present invention.

In FIGS. 3 and 4, the smart transflective LCD device of the present invention comprises a display panel 310, a backlight source (device) 330, a power management controller 350 and at least one photodetector 370.

The display panel 310 has a viewing area 312, wherein the viewing area 312 further comprises a transmissive region 314 and a reflective region 316.

As a demonstrative example, a structure of the display panel 310 is described herein, but is not intended to limit the present invention. In FIG. 3, a first substrate 320, serving as a lower substrate, is provided above the backlight device 330. The first substrate 320 can be a glass substrate comprising a thin film transistor (TFT) array (not shown). A pixel electrode 322 is formed on the first substrate 320, wherein the pixel electrode 322 has a transparent portion 324 and an opaque portion 326. The transparent portion 324 of the pixel electrode 322 is located in the transmissive region 314, and the opaque portion 326 of the pixel electrode 322 is located in the reflective region 316. The transparent portion 324 of the pixel electrode 322 can be an ITO (indium tin oxide) or IZO (indium zinc oxide) layer. The opaque portion 326 of the pixel electrode 322 can be an aluminum or silver layer. A second substrate 328, serving as an upper substrate, is opposite the first substrate 320. The second substrate 328 can be a glass substrate comprising a color filter (not shown) formed thereon. Then, liquid crystal molecules fill a space between the first substrate 320 and the second substrate 328 to form a liquid crystal layer 329 therebetween. The display panel 310 is thus obtained.

The backlight source 330 is disposed under the first substrate 320 and provides a backlight 332 passing through the transmissive region 314 of the display panel 310. The backlight source 330 comprises a light emitting device, such as a cold cathode fluorescent tube (CCFL) or a light emitting diode (LED).

The power management controller 350 is connected to the backlight device by means of the control line 352 (e.g. an electric wire). The power management controller 350 controls the intensity of the backlight 332 by controlling power output.

The photodetector(s) 370 is located on the display panel 310 outside the viewing area 312. The photodetector 370 detects the intensity of ambient light 380 around the display panel 310, and then provides a corresponding signal to the power management controller 350 by means of a signal line 371 to control the intensity of the backlight 332. The photodetector 370 can be a photosensitive resistor device or a photodiode device.

Referring to FIG. 4, there is shown the transflective LCD display panel 310 of the preferred embodiment of the present invention. The display panel 310 includes the viewing area 312, and in the preferred embodiment, at least four photodetectors 370 are placed at the middle edge of the display panel 310. The reason is that the positions are the nearest points to the center of the viewing area 312 at each edge.

An operational example is illustrated hereinafter. When the photodetector 370 senses a higher intensity ambient light above the display panel 310, the photodetector 370 provides a first corresponding signal to the power management controller 350. Based on the first corresponding signal, the power management controller 350 will automatically decrease power output to the backlight device 330, thereby dimming the backlight 332. When the photodetector 370 senses less intense ambient light above the display panel 310, the photodetector 370 provides a second corresponding signal to the power management controller 350. Based on the second corresponding signal, the power management controller 350 will automatically increase power output to the backlight device 330, thereby brightening the backlight 332.

As is apparent from the above description, The transflective LCD device of the present invention can self-adjust the backlight intensity to provide optimum (or stable) display based on the availability and intensity ambient light. That is, the total amount of reflected and transmitted light can be maintained at a desired level, thereby achieving self-adjusting display brightness, and reducing power consumption.

Figure 5:
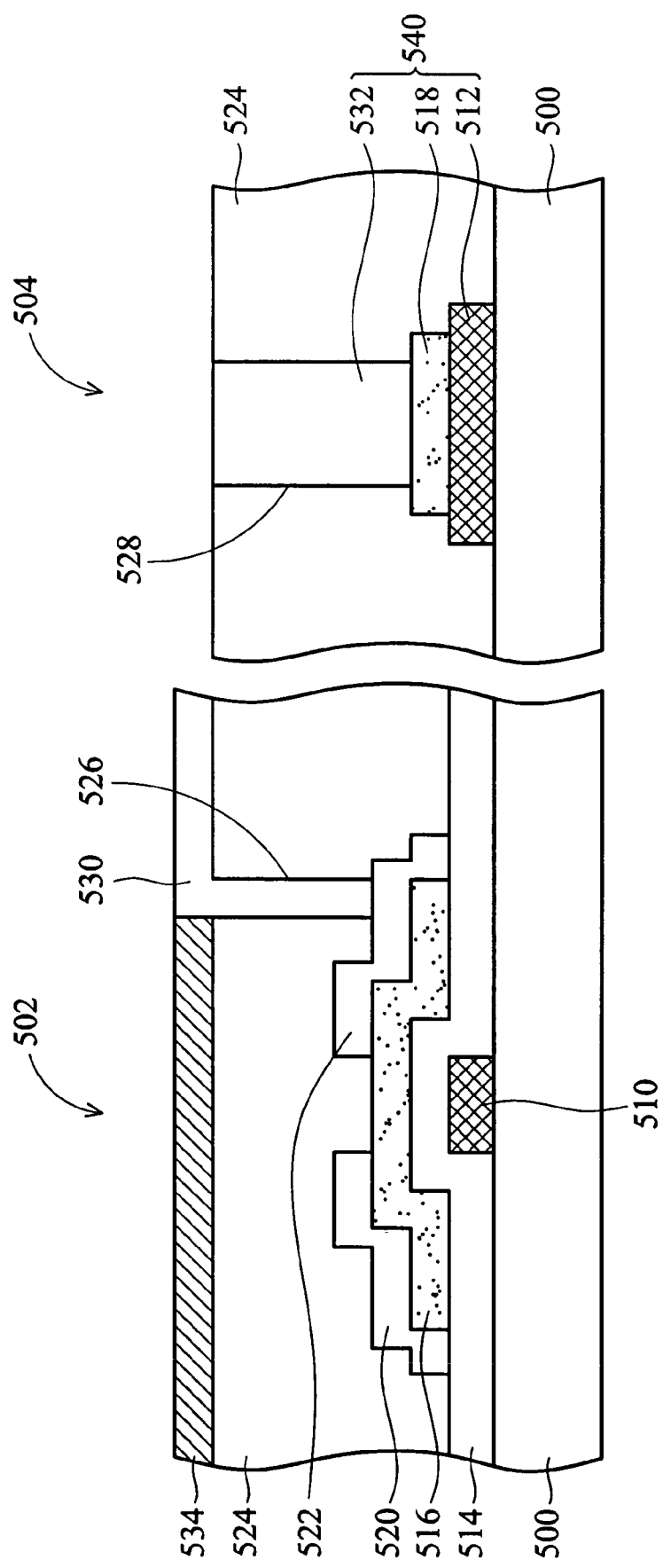
FIG. 5 is a sectional view illustrating simultaneous fabrication of the photodetector and the TFT according to the present invention.

FIG. 5 is a sectional view illustrating simultaneous fabrication of photodetector and the TFT, according to an alternative embodiment of the present invention.

A lower substrate 500 having a predetermined viewing area 502 (or an interior area) and a predetermined peripheral area 504 is provided. The lower substrate 500 can be a glass substrate.

A metal layer (510/512) is next formed on part of the lower substrate 500 in both the viewing and the peripheral areas 502, 504. The metal layer 510 in the viewing area 502 serves as a gate 510, and the metal layer 512 in the peripheral area 504 serves as an anode 512 and a light shield 512. The metal layer (510/512) can be an Al layer formed by sputtering.

A gate insulating layer 514 is formed on the gate 510 and part of the lower substrate 500. The gate insulating layer 514 can be a $SiO_2$ layer formed by deposition.

Then, a semiconductor layer (516/518) is formed on part of the gate insulating layer 514 and the anode 512. The semiconductor layer 516 on the gate insulating layer 514 serves as a channel layer 516, and the semiconductor layer 518 on the anode 512 serves as a photosensitive layer 518. The semiconductor layer (516/518) can be an amorphous silicon layer. It should be noted that the channel layer 516 and the photosensitive layer 518 can be formed in separate steps. That is, the material of the channel layer 516 can be different from that of the photosensitive layer 518. For example, the channel layer 516 is amorphous silicon and the photosensitive layer 518 is Cadmium Sulfide (CdS) photosensitive material.

A source electrode 520 and a drain electrode 522 are then formed on part of the channel layer 516 on the gate insulating layer 514. The source electrode 520 and the drain electrode 522 can be metal layers, such as Al.

Next, a transparent insulating layer 524 is blanketly formed over the lower substrate 500. The transparent insulating layer 524 can be a $SiO_2$ or SiN layer.

Then, a first opening 526 and a second opening 528 penetrating the insulating layer 524 is formed. The first opening 526 exposes the drain electrode 522 and the second opening 528 exposes the photosensitive layer 518 in the peripheral area 504.

In FIG. 5, the first opening 526 and the second opening 528 are filled with transparent conductive material to form a transparent portion 530 of a pixel electrode in the viewing area 502 and a cathode 532 in the peripheral area 504. The transparent portion 530 of a pixel electrode also extends to part of the insulating layer 524. The transparent conductive material can be ITO (indium tin oxide) or IZO (indium zinc oxide).

Next, a reflective layer 534 is formed on part of the insulating layer 524. The reflective layer 534 can be an aluminum layer or silver layer. The reflective layer 534 serves as an opaque portion 534 of the pixel electrode.

It should be noted that a photodetector 540 comprises the anode 512, the photosensitive layer 518 and the cathode 532 in the peripheral area 504.

Moreover, as is known in the conventional LCD process and similar to the illustration of FIG. 3, a second substrate (not shown) opposite the first substrate 500 is provided. Liquid crystal molecules fill a space between the first substrate 500 and the second substrate (not shown) to form a liquid crystal layer (not shown). In order to avoid obscuring aspects of the present invention, the detailed processes are not described again here.

Thus, the present invention provides a transflective LCD device having photodetectors integrated therein. The photodetector senses ambient lighting conditions above the first substrate, and then provides a corresponding signal to the power management controller to control the intensity of the backlight. Thus, the total amount of reflected and transmitted light can be maintained at a desired level. In addition, the photodetector can be simultaneously fabricated with the TFT. The transflective LCD device of the present invention can self-adjust the backlight intensity to provide optimum (or stable) display based on the availability and intensity ambient light, simplifying use thereof and ameliorating the disadvantages of the prior art.

Finally, while the invention has been described by way of example and in terms of the above, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of fabricating a transflective liquid crystal display device, comprising the steps of:
   providing a first substrate having a viewing area and a peripheral area;
   forming a metal layer on part of the first substrate in both the viewing and the peripheral areas, wherein the metal layer in the viewing area serves as a gate;
   forming a gate insulating layer on the gate;
   forming a semiconductor layer on the gate and the metal layer in the peripheral area;
   forming a source electrode and a drain electrode on part of the semiconductor layer on the gate insulating layer;
   blanketly forming an insulating layer over the first substrate;
   forming a first opening and a second opening penetrating the insulating layer, wherein the first opening exposes the drain electrode and the second opening exposes the semiconductor layer in the peripheral area;

forming a transparent conductive layer in the second opening and the first opening, extending to part of the insulating layer;

forming a reflective layer on part of the insulating layer;

disposing a backlight device under the first substrate, wherein the backlight device provides a backlight passing through the transparent conductive layer extends to part of the insulating layer; and providing a power management controller connected with the backlight device, wherein the power management controller controls an intensity of the backlight;

wherein a photodetector consists of the metal layer, the semiconductor layer and the transparent conductive layer in the peripheral area, and the photodetector detects an intensity of ambient light above the first substrate, and then provides a corresponding signal to the power management controller to control the intensity of the backlight;

wherein, by the power management controller based on the corresponding signal, the intensity of the backlight automatically becomes greater when the intensity of the ambient light becomes lower, and the intensity of the backlight automatically becomes lower when the intensity of the ambient light becomes greater.

2. The method according to claim 1, further comprising the steps of:
providing a second substrate opposite the first substrate; and
filling a space between the first substrate and the second substrate with liquid crystal molecules to form a liquid crystal layer.

3. The method according to claim 2, wherein the first substrate and the second substrate are glass substrates.

4. The method according to claim 1, wherein the metal layer is an Al layer.

5. The method according to claim 1, wherein the insulating layer is a $SiO_2$ layer.

6. The method according to claim 1, wherein the transparent conductive layer is an ITO (indium tin oxide) layer or an IZO (indium zinc oxide) layer.

7. The method according to claim 1, wherein the reflective layer is an aluminum layer or a silver layer.

* * * * *